Aug. 24, 1954
S. SCHNELL
2,687,189
HYDRAULIC POWER BRAKING SYSTEM
Original Filed Dec. 3, 1945
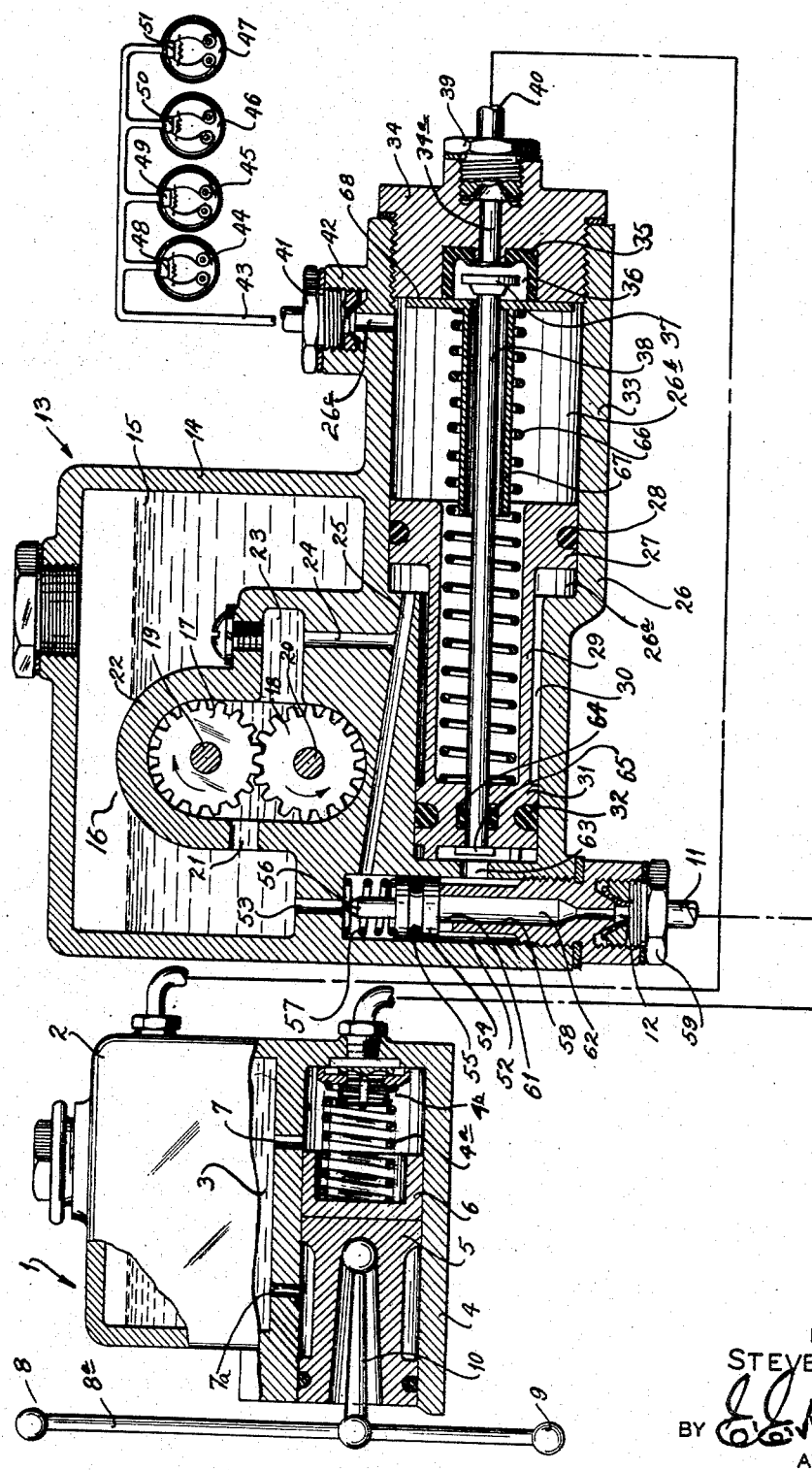
INVENTOR.
STEVE SCHNELL
BY *[signature]*
ATTORNEY Patented Aug. 24, 1954

2,687,189

UNITED STATES PATENT OFFICE 2,687,189

HYDRAULIC POWER BRAKING SYSTEM

Steve Schnell, Kirkwood, Mo., assignor to Wagner Electric Corporation, St. Louis, Mo., a corporation of Delaware Continuation of application Serial No. 632,470, December 3, 1945. This application October 13, 1949, Serial No. 121,181

19 Claims. (Cl. 188—152)

This application is a continuation of my application Serial No. 632,470 filed December 3, 1945, now abandoned.

In a straight manual brake system certain limitations are inherent such as fluid displacement which remains substantially constant for a particular system. Also there are limitations on the distance the foot pedal can travel in bringing about the necessary fluid displacement and fluid pressure. Still further there is a limit on the amount of manual force an operator can apply to a foot pedal. In a straight manual system the amount of manual force required of the operator to produce a given brake operating pressure can be changed by varying the size of the master cylinder piston used. By decreasing the effective area of the piston a greater fluid pressure can be developed with a given manual effort, however, since there must be a given amount of fluid displaced the operator is then required to move the smaller piston a greater distance to displace the proper amount of fluid. Therefore increased piston travel causes increased foot pedal travel which is undesirable and in some instances impossible.

The applicant has overcome the disadvantages of using a smaller master cylinder piston by incorporating a novel power-operated, pressure producing device in an otherwise straight manual system. This added device serves to aid the operator in displacing the required amount of fluid while permitting the use of a smaller piston in the operator controlled master cylinder without increasing the pedal travel or piston travel as the case may be. The net result is that a given brake operating pressure can be produced by the operator with less manual effort. Similarly, a greater pressure can be developed with a given manual effort by using the applicant's novel power braking system.

This invention relates to power-operated braking systems for automotive hydraulic brakes, one object being to provide a system in which the output of the power means, for example, an engine or motor driven pump, is controlled by a pressure-regulated device operated by a master cylinder and in which the control is capable of functioning without regard to the amount of travel of the brake pedal or master cylinder actuator.

Another object of the invention is to provide a power-operated pressure fluid supply for a brake system in which the output of the pump is regulated by a manually-operated master cylinder that initially eliminates the slack in the brake system by forcing the brake shoes into slight contact with the brake drums, thereafter causing the output of the power-operated source to assist in a brake application by supplying an additional braking effort which at any time is a fixed multiple of the braking effort supplied by the manually-operated master cylinder.

Various developments have been made in the art of power-operated brakes in which the output of a pump is employed for progressively increasing the pressure between the brake drums and the brake shoes based upon the degree of travel of the brake pedal in effecting the pump control. The instant invention seeks to overcome certain limitations of such prior art systems by the use of a pressure-operated device for controlling the pump output and for enabling it to assist the operator in displacing the required amount of pressure fluid for operation of the brake mechanism, whereby less brake pedal effort is required of the operator than is normally required in producing a given brake operating pressure. The system in this instance is sufficiently operable to provide braking even if the power operated portion of the system fails to function properly.

The objects and advantages set forth above are achieved in the mechanism illustrated in the accompanying drawing in which the pressure producing device 1 comprises a master cylinder 4 having a casing 2 associated therewith in which is formed a reservoir 3 filled with a suitable brake fluid. A spool type piston 5 in cylinder 4 has a packing cup 6 arranged ahead of it and a spring 4a cooperating with valve 4b urges piston 5 to the left. The valve 4b controls the return flow of fluid to cylinder 4 by maintaining a slight pressure in the conduit and mechanism associated therewith. The piston 5 is reciprocated by means of actuator 8 comprising a lever 8a adapted for pivoting about ball 9 and a member 10 connects lever 8a with piston 5. A conventional brake pedal actuator may be used in lieu of that shown. A compensating aperture 7 is arranged in the wall of cylinder 4 and another aperture 7a maintains the space about piston 5 filled with fluid. Forward movement of piston 5 covers aperture 7 and forces fluid out of the master cylinder past valve 4b. During the return stroke of piston 5, aided by spring 4a, some fluid behind piston 5 may flow past packing cup 6 into the space ahead of the piston. A more extensive explanation of the operation of the master cylinder is set forth in United States Patent No. 1,758,671 which shows a detailed construction thereof.

A second pressure producing device 13 comprises a counterbored cylinder 26 with which casing 14 is associated. A reservoir 15 is formed in the casing containing a suitable brake fluid. A power driven pressure producer, preferably a rotary pump 16, is associated with cylinder 26. This pump consists of a pair of gears 17 and 18 fixed to shafts 19 and 20, respectively, one of which is motor driven or may be driven by the vehicle prime mover, each shaft being rotatable in a housing 22 preferably formed integral with the casing of cylinder 26. An inlet 21 is formed in casing 22 and ducts 23, 24 and 25 connect the pump with chamber 26a of cylinder 26 in order that the controlled output thereof may be applied to the piston in cylinder 26.

The cylinder 26 has a differentially diametered piston therein which comprises two heads 27 and 31 connected by portion 29. The larger diametered head 27 is movable in the larger bore of the cylinder and head 31 is movable in the smaller bore 30 of the cylinder. A sealing ring 28 prevents leakage past head 27 and sealing ring 32 prevents leakage past head 31.

A fitting 34 is threaded into the larger diametered portion 33 of cylinder 26 and has a cavity 36 therein in which a valve seat 35 is assembled. A valve 37, secured to rod 38 extending through piston head 31, is engageable with seat 35. The valve 37 controls passageway 34a in fitting 34 and another fitting 39 threaded into fitting 34 has a conduit 40 associated therewith. Conduit 40 connects reservoir 3 with chamber 26b of cylinder 26.

Another fixture 41 is threaded into boss 42 formed on portion 33 of cylinder 26 having a duct 26c therein for conducting fluid into the brake motor supply conduit 43 from chamber 26b. The conduit 43 conducts fluid to brake cylinders or motors 48, 49, 50 and 51 of brake assemblies 44, 45, 46 and 47. In actual installations the several brake cylinders 48—51 and cylinder 26 are to be disposed at a lower level than reservoir 3.

The output of master cylinder 4 is conducted by means of conduit 11 to fixture 59 secured to fitting 58 threaded into bore 52. Fluid is conducted from conduit 11 through duct 12, duct 62 and passage 61 into bore 52 and thence through duct 63 into bore 30 of cylinder 26 to the left of piston head 31.

It is preferable that piston head 31 and piston 5 be of the same diameter and, for the purposes of this invention, it is suitable that piston head 27 have about twice the area of piston head 31, the effective or projected area of the left side of said piston head 27 being about equal to the area of the piston head 31. It will be understood that the portion of the required total braking force which is supplied by the power means may be varied by varying the ratio of the diameters of the two bores of cylinder 26.

A piston 54, provided with a sealing ring 55, is slidably received in bore 52. The valve member 56 is associated with piston 54 and seats in the lower portion of duct 53 which connects bore 52 with reservoir 15. The bore of duct 53 and the maximum distance which the valve member 56 can move away from its seat in the lower portion of duct 53, are so selected that the fluid circulated by the rotary pump 16 can discharge through duct 53 into the reservoir 15 without building up a noticeable pressure in the space above piston 54 when the valve member 56 is positioned at its maximum distance from its seat. A spring 57 disposed about valve 56 engages piston 54 and normally moves valve 56 to its disengaged position when no pressure is being applied to the lower face of piston 54. The upper end of fitting 58 functions as a stop for said piston 54.

The duct 25 connects chamber 26a, located ahead of piston 27, with the space defined by the bore 52 above piston 54. Any fluid pressure in the latter chamber acts on piston 54 and valve member 56 for controlling the opening in duct 53. The same pressure also exists, due to the duct 25, in chamber 26a where it acts on the piston head 27. Thus when valve member 56 is unseated its maximum possible amount the pump will merely circulate fluid from reservoir 15 through duct 21 and then through passages 23, 24 and 25, bore 52 above piston 54 and duct 53 back into reservoir 15 without creating any noticeable pressure in either the space defined by the bore 52 above piston 54 or the chamber 26a located ahead of the piston 27. The interaction between the piston 54, valve member 56, conduit 53 and piston head 27, is more fully set forth below in connection with the operation of the apparatus.

The valve 37 is closed upon initial movement to the right of the piston in cylinder 26. The rod 38 moves along with the piston by reason of the fluid pressure applied to head 65 and the frictional action of the packing or sealing member 64 in piston head 31 surrounding and engaging the rod. After valve 37 is brought into contact with the seat of member 35, the fluid pressure in chamber 26b increases due to the movement of piston 27. The relationship between the contact areas of the face of valve 37 and the seat of member 35 is so selected that the contacting pressure between these two members increases with increasing fluid pressure in chamber 26b.

When the piston starts on its return stroke the valve 37 will not immediately unseat from member 35 as the fluid pressure in chamber 26b will hold valve 37 closed until the pressure in chamber 26b has sufficiently decreased due to the return movement of piston 27 to permit the friction between seal 64 and rod 38 to open said valve. If the valve fails to open at this stage, it will be forced open when the piston has traveled sufficiently to the left to contact the head 65 of rod 38. The spring 66 causes the piston in cylinder 26 to return to the "off" position shown when the brakes are released. The spring 66 is received about a tube 67 to which a flange 68 is secured, the tube and flange tending to hold the spring centered with respect to cylinder 26. A suitable passageway is formed in flange 68 for allowing passage of fluid from conduit 40 to chamber 26b.

Referring to operation of the apparatus described, a forward movement of piston 5 will cover aperture 7 and then move piston heads 31 and 27 substantially the same distance because it is assumed that piston 5 and head 31 have the same diameter. The rod 38 will be carried along with head 31 because of the pressure acting on head 65 and the friction between the rod and the piston until valve 37 engages seat 35, thereafter head 31 will move relatively to rod 38. The seating of valve 37 will thereafter prevent fluid from chamber 26b returning to reservoir 3 through conduit 40. The valve 37 is held against seat 35 by reason of the fluid pressure in chamber 26b acting on the left side of valve 37 and by the fluid pressure in the cylinder to the left of piston head 31 acting on head 65 of rod 38. Fluid forced into the brake motors by piston head 27 will, therefore, quickly move the shoes of brake assemblies 44—47 into engagement with the brake drums and tensioning the return springs thereon. Thereafter the brake shoes will begin to resist the movement imparted to them by the brake motors which will consequently cause a pressure to be built up by the master cylinder 4 to the left of piston head 31 and in bore 52. The spring 57 is so chosen that it is possessed of only sufficient strength to resist the force on the lower side of piston 54 due to the pressure of the brake fluid prior to engagement between the brake shoes and the brake drums. However, after contact has been made between the brake shoes and their respective drums, the slightest increase in pressure below piston 54 will cause said piston to move upwardly, thus decreasing the distance between the head of valve member 56 and the opening in the lower end of duct 53. This reduction in the valve passage builds up a fluid pressure in the chamber defined by bore 52 above the upper face of piston 54, the fluid being supplied by pump 16 through passages 23, 24 and 25. The increased pressure in this chamber creates a downward force on the top of piston 54 which counteracts the upward force acting on the lower face of piston 54 due to the fluid pressure furnished by the master cylinder. Thus the upward movement of piston 54 ceases when the opening between the head of valve member 56 and the seat in the lower end of duct 53 is sufficiently reduced to build up a fluid pressure in the chamber defined by bore 52 above the upper face of piston 54 which substantially equals the master cylinder pressure. When equal pressures are acting on the upper and lower faces of piston 54, the piston is in equilibrium or balanced position. The pressure of the fluid delivered by pump 16 to chamber 26a also equals the pressure acting on the upper face of piston 54 by reason of the connecting passage 25. Thus a fluid pressure equal to that in the master cylinder acts on the left hand surface of piston 31 and a fluid pressure of equal value, but furnished by the pump, acts on the left hand surface of piston 27. The sum of these two surfaces equals the projected right hand surface of piston head 27. Consequently, the fluid pressure in chamber 26b equals the pressure in the master cylinder. During the short time the pressure of the master cylinder fluid and of the fluid furnished by pump 16 was building up to equal values, the pistons 31—27 moved to the right, consequently the wheel cylinders 48—51 are now carrying a fluid pressure equal to that in the master cylinder.

Upon further increase of pressure in the master cylinder, piston 54 moves somewhat higher, thus decreasing the opening in duct 53, thereby increasing the pressure of the fluid furnished by the pump to the chamber defined by bore 52 above the top surface of piston 54 and also to chamber 26a. This fluid pressure increases until the force exerted by it on the upper part of piston 54 equals the force acting upon the lower part of piston 54. In the meantime piston heads 31—27 have moved further to the right and thus supplied the wheel cylinders 48—51 with a fluid pressure equal to the increased pressure in the master cylinder.

When the pressure on the master cylinder and in the lower part of bore 52 decreases, the pressure of the fluid furnished by pump 16 adjusts itself to be substantially equal to the pressure in the lower part of bore 52 developed by the master cylinder. This adjustment is brought about by the downward movement of piston 54, valve member 56, and the consequent increased opening between the head of valve member 56 and duct 53. When piston 54 has reached its balanced position, the force acting on the upper side of piston 54 equals that acting on the lower side thereof. Thus the area of the upper face of piston 54 was assumed to equal the area of the lower face of piston 54 and it follows that the fluid pressure furnished by the pump is substantially equal to the fluid pressure in the master cylinder.

The piston 54 with its attached valve member 56 arranged for controlling the opening of duct 53, may be compared to a "relief" valve whose release pressure is adjustable, the adjustment being made by varying the unit fluid pressure developed by the master cylinder 4 and piston 5 which varies the force acting upwardly on the lower face of piston 54, thereby controlling the restriction of the opening of the "relief valve" formed by the head of member 56 and the lower part of duct 53.

Since a constant proportion of the total brake force acting on the brake friction elements is always furnished by master cylinder 4, the operator has the same "feel" with respect to the brake force being applied at any particular instant as he would have in a hydraulic brake system where all the power is manually supplied.

It was shown previously that the fluid pressure per square inch acting on the face of piston 31 equals the fluid pressure acting on the left hand face of piston 27 and also equal to the fluid pressure per square inch in chamber 26b which in turn equals the fluid pressure in the wheel cylinders. Thus the fluid pressure in the wheel cylinders is the same as would exist if the fluid of the master cylinder 4 were connected directly with the wheel cylinders. The increased braking effort which results from the use of the power-operated or "boosting" apparatus is, therefore, in the case described, not brought about by increasing the value of the fluid pressure acting in the wheel cylinders above the pressure value existing in the master cylinder but is brought about as a result of increasing the pressure developed by the master cylinder with a given manual effort on the part of the operator.

In a straight manual system it would be necessary to use a master cylinder piston having an effective area substantially the same as the right hand face of piston 27 to provide for the required amount of fluid displacement, assuming the foot pedal travel to be a fixed value. The piston 27 in the present case has an effective area twice that of the master cylinder piston 5. Therefore, if the pump 16 failed to operate during a braking application the operator would be compelled to move the piston 27 entirely by the manual force applied to the foot pedal or lever 8a and which would be the same as having a straight manual system with the larger master cylinder piston. Since the ratio of areas between the above mentioned pistons is 2 to 1 then the operator would be required to exert twice the manual force to produce a given braking pressure than that required when the pump 16 is functioning properly to assist in moving the large piston 27 rightwardly. Stated differently, a given pedal effort by the operator under this condition would product only one-half of the braking pressure developed under normal conditions.

When the master cylinder 4 is rendered inoperative, the pressure of the fluid circulated by pump 16 will simultaneously become ineffective by the combination of fluid pressure existing in the chamber defined by bore 52 above piston 54 and the force of spring 57 will force piston 54 downward, thus opening the lower orifice of duct 53 to its fullest extent thereby reducing the fluid pressure in passage 25 to a negligible value and reducing the force acting toward the right on the left hand face of piston 27 to a negligible value substantially as explained previously. Thus the spring 66 will move the piston assembly in cylinder 26 to the left, carrying with it rod 38 during the latter part of such movement, thereby opening valve 37 and restoring the hydraulic device 13 to the condition shown in the drawing. The ratio of springs 4a and 66 is such that some fluid will flow from bore 52 and the associated chamber back to master cylinder 4. This is necessary in order to allow the master cylinder to be restored to the position shown, although valve 4b does keep the fluid in conduit 11, bore 52 and associated chamber under a light pressure.

Should there be a loss of fluid from the brake system during a brake application, resulting in the volume of fluid returning from the brake motors to the cylinder chamber 26b being less than that displaced in applying the brakes, spring 66 nevertheless returns the piston 31—27 to full "off" position and the lost fluid will be replaced by flow from reservoir 3 through conduit 40 past valve 37.

The above describes the normal functioning of the complete apparatus. Under abnormal conditions, for instance if the gear pump fails to operate, the car on which the brakes are installed, is not completely without brakes because the operator is still in the position of being able to apply the brakes manually, but only a reduced braking effort is available by reason of the fact that the power assisting member is inoperative.

What I claim is:

1. A hydraulic braking system comprising a pressure fluid cylinder having a manually-operated piston therein, a second pressure fluid cylinder having a piston reciprocable therein, a power driven pump for applying pressure to the piston of said second cylinder, a brake motor operatively connected to said second cylinder, means enabling the piston of said first mentioned cylinder to directly apply pressure fluid to the piston of said second cylinder for initially actuating the brake motor; and valve means responsive to pressure fluid produced by said first mentioned cylinder piston for causing said pump to apply pressure to the piston of said second cylinder at substantially the same pressure as that developed in said first mentioned pressure fluid cylinder.

2. A hydraulic braking system comprising a pressure fluid cylinder having a manually operable piston therein, a second pressure fluid cylinder having a cooperating piston therein, a brake motor operatively connected to said second cylinder only, power means for actuating the piston of said second cylinder; and valve means responsive to fluid pressure developed by the piston of said first mentioned cylinder to cause said power-operated means to apply pressure to the piston of said second cylinder and at substantially the same pressure as that developed in said first mentioned pressure fluid cylinder.

3. In a braking system comprising a cylinder having a piston therein, a second cylinder having a piston therein, a power driven pump operatively associated with said second cylinder, a brake actuating motor operatively connected to said second cylinder only, means operatively associated with said first mentioned cylinder and its piston and said second cylinder and its piston for causing the piston in said first mentioned cylinder to apply pressure to said piston in said second cylinder to thereby provide a portion of the total force for operating said brake actuating motor; and valve means responsive to fluid pressure developed by said piston in said first mentioned cylinder for causing said pump to act on the piston in said second cylinder at a pressure substantially the same as that developed in said first mentioned cylinder for supplying the remainder of the total force for operating said brake actuating motor.

4. In a braking mechanism comprising a cylinder and a piston, a second cylinder and a piston therein, a pump connected to said second cylinder, a brake actuating motor connected to said second cylinder only; and means operatively associating said pump with one of said piston-cylinder devices for enabling the piston in said first mentioned cylinder to provide a part of the total force for operating said brake actuating motor from the other piston cylinder device, said pump supplying pressure fluid to said second cylinder at substantially the same pressure as that developed in said first mentioned cylinder for supplying the remainder of the total force for operating said brake actuating motor.

5. A braking system comprising a cylinder having a manually-operated piston therein, a fluid reservoir associated therewith, a second cylinder having a piston therein, a power driven pump operatively associated with said second cylinder, a brake, means including a brake shoe and a brake drum, actuating means for said brake means and operable by said piston in said second cylinder only, means establishing fluid communication between said second cylinder and said brake actuating means, means enabling the piston in said first mentioned cylinder to apply pressure to the piston in said second cylinder to thereby apply pressure to the fluid in said communication means and bring said brake shoe into contact with said drum, a pressure responsive valve device operable by fluid pressure developed by said piston in said first mentioned cylinder, a valve associated with said device for controlling the pressure developed by said pump, the pressure developed by said pump being applied to the piston in said second cylinder for assisting the piston in said first mentioned cylinder to actuate said brake means after said shoe has been brought into engagement with said drum; and valve means in said second cylinder governing an outlet therein connected to said reservoir for keeping said brake actuating means, said communication means, and the portion of said second cylinder connected to said brake actuating means, filled with fluid.

6. A braking system comprising a cylinder having a manually operable piston therein, a fluid reservoir associated with said cylinder, a second cylinder having a piston therein, a power driven pump associated with said second cylinder, a brake including a brake shoe and a brake drum, brake actuating means operatively associated with said second cylinder only, means for establishing fluid communication between said second cylinder and said brake actuating means, a pressure responsive device including a valve operatively associated with said second cylinder, means for operating said device by pressure developed by said manually operable piston, means by which said piston in said second cylinder is operated by pressure developed by said manually operable piston to thereby enable fluid acted on by the piston in said cylinder to bring said brake shoe into engagement with said drum, said valve means upon actuation of said device causing said pump to apply pressure developed thereby to said piston in said second cylinder for assisting said manually operable piston to operate said brake actuating means after said brake shoe engages said drum; and means including a valve and a conduit connected between said second cylinder and said reservoir associated with said first mentioned cylinder for keeping said second cylinder, said communication means and said brake actuating means filled with fluid.

7. A braking system comprising a cylinder having a manually-operated piston therein, a second cylinder having a piston therein, a pump associated with said second cylinder, a brake including a brake shoe and a brake drum, a brake actuating mechanism to be operated by said second cylinder only, a pressure responsive device operable by pressure developed by the piston in said first mentioned cylinder, said device associated with said second cylinder and including a valve arranged in the outlet of said pump, means for actuating said pressure responsive device by pressure fluid produced by said manually-operated piston; and means for enabling the pressure fluid produced by said manually-operated piston to actuate the piston in said second cylinder to thereby bring said brake shoe into contact only with said brake drum, said manually-operated piston actuating said pressure fluid responsive device after said brake shoe has been forced into pressure contact with said drum for enabling said pump to develop a pressure substantially equal to that developed in said first mentioned cylinder to assist the piston in said first mentioned cylinder to actuate said piston in said second cylinder and thereby operate said brake.

8. A braking system comprising a cylinder having a piston therein, a second cylinder having a piston therein, a power driven pump associated with said second cylinder, a pressure responsive device operatively associated with said second cylinder, said device including a valve for controlling the pressure developed by said pump, a brake including a brake shoe and a brake drum, actuating mechanism for said brake to be operated by the piston in said second cylinder only, means for enabling said first mentioned cylinder piston to actuate said pressure responsive device, means for enabling said first mentioned cylinder piston to actuate only the piston in said second cylinder and bring said brake shoe into contact only with said drum, said pump operative on the piston in said second cylinder after brake drum and shoe contact has been established, the pressure thereafter produced by said first mentioned cylinder piston actuating said pressure responsive device for causing said pump pressure to assist the piston in said first mentioned cylinder to actuate said piston in said second cylinder, thereby bringing said shoe and said brake drum into pressure contact; and means including a valve during initial movement of the piston in said second cylinder for enabling said brake actuating mechanism and said second cylinder to be kept filled with liquid when said piston in said second cylinder is retracted.

9. A braking system comprising a master cylinder having a manually-operated piston therein, a cylinder having a bore and a counterbore, a piston in said cylinder having a head in each bore, said heads connected together, the smaller of said heads having an area substantially equal to that of the piston in said master cylinder, a power driven pump operatively associated with said cylinder whose output is applied to the larger piston head for assisting said manually-operated piston to actuate said piston in said cylinder, brake actuating means operable solely by the piston in said cylinder, a pressure responsive means operable by the pressure fluid produced by said manually-operated piston associated with said cylinder and including a normally open spring-pressed valve for controlling the pressure produced by said pump; and means for enabling the pressure fluid produced by said manually-operated master cylinder to be applied to said smaller piston head for actuating the larger piston head a limited distance, said pressure responsive device when subjected to the pressure fluid produced by said manually-operated piston opposed by the pressure fluid produced by said pump and assisted by said spring for controlling the pressure developed by said pump.

10. A braking system comprising a master cylinder having a manually operable piston therein, a cylinder having a bore and a counterbore and a piston provided with differentially diametered heads located in the counterbored cylinder, the smaller of said pistons being the same diameter as the piston in said master cylinder, a pump, a brake including a brake shoe and a brake drum, brake actuating means operable solely by said larger diametered head, a pressure responsive device including a valve for regulating the output of said pump operable by pressure fluid developed by said manually operable piston, means for enabling the pressure fluid developed by said manually operable piston to be applied to said smaller piston head for actuating said brake shoe into contact only with said brake drum, said pump applying pressure to the larger of said piston heads for assisting said manually operable piston operating said brake actuating means after said shoe has pressure contacted said drum; and said valve opened and closed by the differential in pressure developed by said manually operable piston and said pump for enabling the pump pressure and the master cylinder pressure to be substantially equal after pressnure is applied to said brake shoe.

11. A braking system comprising a master cylinder having a manually-operated piston therein, a cylinder having a differentially diametered piston therein, a pump operatively connected to said cylinder, a brake including a brake shoe and a brake drum, brake actuating means to be operated by the larger diametered piston head in said cylinder, means for applying the pressure fluid produced by said manually-operated piston solely to the smaller head of said piston in said cylinder for moving both pistons the same distance and bringing said shoe into contact only with said drum; and a pressure responsive device for regulating said pump to enable it to assist said manually-operated piston in applying pressure to said shoe by acting on the larger diametered portion of said piston in said cylinder which includes a normally open spring-pressed piston valve mechanism arranged in the pump outlet, said pump pressure acting on the piston portion of said piston valve aided by said spring to keep said valve open and in which said manually-operated piston pressure acts on the other side of said piston valve for urging said valve to closed position to thereby maintain pressure on said brake shoe.

12. A braking system comprising a master cylinder having a manually-operated piston therein, a cylinder having a differentially diametered piston therein, a power-operated pump operatively connected to said cylinder, a brake including a brake shoe and a brake drum, brake actuating means to be actuated by the piston in said cylinder, means for enabling said master cylinder to act solely on the smaller portion of said piston for initially actuating said brake shoe into contact only with said brake drum; and means for causing said pump to assist the pressure developed by said manually-operated piston in bringing said brake shoe into pressure contact with said brake drum by acting on the larger head of said piston, thereby actuating said brake actuating means at higher pressure which means includes a piston valve mechanism and a spring for urging said piston valve to a normally open position, the pressure of said pump and said spring acting to hold said piston valve device open and opposed by the pressure developed by said manually-operated piston acting to close said valve for regulating the pressure developed by said pump while maintaining said brake shoe in pressure contact with said brake drum.

13. A braking system comprising a cylinder having a manually-operated piston therein, a second cylinder having a piston therein, a pump operatively associated with said second cylinder, a brake including a brake shoe and a brake drum, operating means for said brake, means for establishing fluid communication between said second cylinder and said brake operating means, means for actuating the piston in said second cylinder solely by said manually-operated piston for bringing said brake shoe into contact only with said drum by fluid pressure derived from said first mentioned cylinder; and a pressure responsive device including a valve arranged in the outlet of said pump, said valve being moved to closed position by the pressure developed by said piston in said first mentioned cylinder after said brake shoe and said brake drum are in pressure contact, thereby enabling said pump to develop a pressure for assisting said manually-operated piston to operate said piston in said second cylinder.

14. A hydraulic braking system comprising a pressure fluid cylinder having a manually-operated piston therein, a second pressure fluid cylinder having a piston reciprocable therein, a power driven pump for applying pressure to the piston of said second cylinder, a brake motor operatively connected to said second cylinder, means enabling the piston of said first mentioned cylinder to solely directly apply pressure fluid to the piston of said second cylinder; and valve means responsive to pressure fluid produced by said first mentioned cylinder piston for causing said pump to apply pressure to the piston of said second cylinder constantly proportional to that developed in said pressure fluid cylinder.

15. In a braking system comprising a cylinder having a piston therein, a second cylinder having a piston therein, a power driven pump operatively associated with said second cylinder, a brake actuating motor operatively connected solely to said second cylinder, means operatively associated with said first mentioned cylinder and its piston and said second cylinder and its piston for enabling the piston in said first mentioned cylinder to apply pressure to said piston in said second cylinder to thereby provide a portion of the total force for operating said brake actuating motor; and means responsive to pressure developed by said piston in said first mentioned cylinder for causing said pump to act on the piston in said second cylinder at a pressure constantly proportional to that in said first mentioned cylinder for supplying the remainder of the total force for operating said brake actuating motor.

16. In a braking mechanism comprising a cylinder and a piston, a second cylinder and a piston therein, a pump connected to said second cylinder, a brake actuating motor connected solely to said second cylinder; and means operatively associating said pump and said piston-cylinder devices for enabling the piston in said first mentioned cylinder to provide a part of the total force for operating said brake actuating motor and said pump supplying pressure fluid to said second cylinder at a pressure constantly proportional to that developed in said first mentioned cylinder for supplying the remainder of the total force for operating said brake actuating motor.

17. A hydraulic braking system comprising a cylinder, a piston slidably mounted in said cylinder, a second cylinder provided with a bore and a counterbore, a piston having a head slidable in each bore, the heads being connected together, a brake operating motor having an expansible chamber therein, means for establishing the sole communication between said motor chamber and the counterbore in said second cylinder, means for establishing communication between said bore in said second cylinder and said first mentioned cylinder whereby the piston in said second cylinder will be actuated for expanding the chamber in said motor, a pump for assisting the piston in said second cylinder in further expanding the chamber in said motor; and means responsive to pressure developed by said pump and said cylinder and the piston therein for controlling the output of said pump in order that the pressure developed by said pump will remain constantly proportional to the pressure developed by said cylinder and its piston.

18. A hydraulic braking system comprising a cylinder, a piston slidable in said cylinder, manually operable means for sliding said piston in said cylinder, a second cylinder provided with a bore and a counterbore, a piston having heads thereon, one head slidably received in each bore in said second cylinder, a brake motor provided with an expansible chamber, means for establishing the sole communication between said counterbore and said motor chamber, means for establishing communication between said first mentioned cylinder and said bore in said second cylinder for moving said piston in said second cylinder by pressure fluid developed in said first mentioned cylinder to thereby expand the chamber in said motor, a pump acting on the piston in said second motor for additionally expanding the chamber in said motor; and a valve responsive to the pressure developed in said first mentioned cylinder and the pressure developed by said pump for regulating the pump pressure, said pressures remaining constantly proportional as the volume of said motor chamber varies.

19. A hydraulic braking system comprising a cylinder, a piston slidable in said cylinder, a second cylinder provided with a bore and a counterbore, a piston provided with two heads, one head slidably received in each bore, the head in the smaller bore having a diameter substantially equal to the diameter of the piston in said first mentioned cylinder, a motor having an expansible chamber, means for establishing communication only between said motor chamber and said counterbore, means for establishing communication between said cylinder and the bore in said second mentioned cylinder for moving the piston in said second cylinder by pressure fluid developed in said first mentioned cylinder, the movement being substantially equal to the movement of the piston in said first mentioned cylinder and the head in said bore, a pump for applying pressure to the piston in said second cylinder for further expanding the volume of said motor chamber; and means for balancing the pressure developed by the piston in said first mentioned cylinder and the pressure developed by said pump for regulating the output of said pump and holding the pump pressure constantly proportional to the pressure in said cylinder.

References Cited in the file of this patent

UNITED STATES PATENTS

| Number | Name | Date |
|---|---|---|
| 1,921,590 | Staude | Aug. 8, 1933 |
| 1,997,062 | Huffman | Apr. 9, 1935 |
| 2,275,697 | Stelzer | Mar. 10, 1942 |
| 2,318,756 | Chouings | May 11, 1943 |
| 2,381,989 | Stelzer | Aug. 14, 1945 |
| 2,393,524 | Fant | Jan. 22, 1946 |

FOREIGN PATENTS

| Number | Country | Date |
|---|---|---|
| 198,007 | Great Britain | May 28, 1923 |